(12) United States Patent
Quader et al.

(10) Patent No.: US 11,403,486 B2
(45) Date of Patent: Aug. 2, 2022

(54) METHODS AND SYSTEMS FOR TRAINING CONVOLUTIONAL NEURAL NETWORK USING BUILT-IN ATTENTION

(71) Applicants: Niamul Quader, Toronto (CA); Md Ibrahim Khalil, Toronto (CA); Juwei Lu, North York (CA); Peng Dai, Markham (CA); Wei Li, Markham (CA)

(72) Inventors: Niamul Quader, Toronto (CA); Md Ibrahim Khalil, Toronto (CA); Juwei Lu, North York (CA); Peng Dai, Markham (CA); Wei Li, Markham (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 38 days.

(21) Appl. No.: 17/095,257

(22) Filed: Nov. 11, 2020

(65) Prior Publication Data

US 2021/0142106 A1    May 13, 2021

Related U.S. Application Data

(60) Provisional application No. 62/934,744, filed on Nov. 13, 2019.

(51) Int. Cl.
*G06K 9/62* (2022.01)
*G06N 3/08* (2006.01)
(Continued)

(52) U.S. Cl.
CPC .............. *G06K 9/6256* (2013.01); *G06N 3/04* (2013.01); *G06N 3/08* (2013.01); *G06V 30/194* (2022.01)

(58) Field of Classification Search
CPC ...... G06K 9/6256; G06K 9/6271; G06N 3/04; G06N 3/08; G06N 3/0454; G06N 3/084; G06V 30/194; G06V 10/82
(Continued)

(56) References Cited

U.S. PATENT DOCUMENTS

| 2019/0087713 A1 | 3/2019 | Lamb et al. |
| 2019/0130250 A1 | 5/2019 | Park et al. |
| 2021/0182683 A1* | 6/2021 | Dai ...................... G06N 3/0454 |

FOREIGN PATENT DOCUMENTS

| CN | 108416427 A | 8/2018 |
| CN | 110135460 A | 8/2019 |

OTHER PUBLICATIONS

Chen Xue, "Convolutional Neural Network Algorithm and Case", Journal of Guangdong University of Technology, English machine translation, Nov. 2017. (Year: 2017).*

(Continued)

*Primary Examiner* — Juan A Torres (57) ABSTRACT

Methods and systems for updating the weights of a set of convolution kernels of a convolutional layer of a neural network are described. A set of convolution kernels having attention-infused weights is generated by using an attention mechanism based on characteristics of the weights. For example, a set of location-based attention multipliers is applied to weights in the set of convolution kernels, a magnitude-based attention function is applied to the weights in the set of convolution kernels, or both. An output activation map is generated using the set of convolution kernels with attention-infused weights. A loss for the neural network is computed, and the gradient is back propagated to update the attention-infused weights of the convolution kernels.

20 Claims, 7 Drawing Sheets

(51) Int. Cl.
*G06N 3/04* (2006.01)
*G06V 30/194* (2022.01)
(58) Field of Classification Search
USPC .......................................................... 382/159
See application file for complete search history.

(56) References Cited

OTHER PUBLICATIONS

Chen Xu et al,"Convolutional Neural Network Algorithm and Case", Journal of Guangdong University of Technology, vol. 34 No. 6, total 7 pages. With an English Abstract. Nov. 2017.
Kashyap Chitta,"Targeted Kernel Networks: Faster Convolutions with Attentive Regularization", ECCV 2018: Computer Vision ECCV 2018 Workshops, total 19 pages. Sep. 2018.
Irwan Bello, Barret Zoph, Ashish Vaswani, Jonathon Shlens, and Quoc V Le. Attention augmented convolutional networks. arXiv preprint arXiv:1904.09925 2019.
Carl W Cotman and Joseph H Su. Mechanisms of neuronal death in alzheimer's disease. Brain pathology, 6(4) 1996.
Mark Everingham, SM Ali Eslami, Luc Van Gool, Christopher KI Williams, John Winn, and Andrew Zisserman. The pascal visual object classes challenge: A retrospective. International journal of computer vision 2015.
Kaiming He, Xiangyu Zhang, Shaoqing Ren, and Jian Sun. Deep residual learning for image recognition. In Proceedings of the IEEE conference on computer vision and pattern recognition 2016.
Jie Hu, Li Shen, Samuel Albanie, Gang Sun, and Andrea Vedaldi. Gather-excite: Exploiting feature context in convolutional neural networks. In Advances in Neural Information Processing Systems 2018.
Jie Hu, Li Shen, and Gang Sun. Squeeze-and-excitation networks. In Proceedings of the IEEE conference on computer vision and pattern recognition 2018.
Diederik P Kingma and Jimmy Ba. Adam: A method for stochastic optimization. arXiv preprint arXiv:1412.6980 2014.
Alex Krizhevsky, Geoffrey Hinton, et al. Learning multiple layers of features from tiny images. Technical report, Citeseer 2009.
Hao Li, Zheng Xu, Gavin Taylor, Christoph Studer, and Tom Goldstein. Visualizing the loss landscape of neural nets. In Advances in Neural Information Processing Systems 2018.
Ji Lin, Chuang Gan, and Song Han. Temporal shift module for efficient video understanding. arXiv preprint arXiv:1811.08383 2018.
Tsung-Yi Lin, Michael Maire, Serge Belongie, James Hays, Pietro Perona, Deva Ramanan, Piotr Doll' ar, and C Lawrence Zitnick. Microsoft coco: Common objects in context. In European conference on computer vision 2014.
Takeru Miyato, Toshiki Kataoka, Masanori Koyama, and Yuichi Yoshida. Spectral normalization for generative adversarial networks. arXiv preprint arXiv:1802.05957 2018.
Jongchan Park, Sanghyun Woo, Joon-Young Lee, and In So Kweon. Bam: Bottleneck attention module. arXiv preprint arXiv:1807.06514 2018.
Siyuan Qiao, Huiyu Wang, Chenxi Liu, Wei Shen, and Alan Yuille. Weight standardization. arXiv preprint arXiv:1903.10520 2019.
Olga Russakovsky, Jia Deng, Hao Su, Jonathan Krause, Sanjeev Satheesh, Sean Ma, Zhiheng Huang, Andrej Karpathy, Aditya Khosla, Michael Bernstein, et al. Imagenet large scale visual recognition challenge. International journal of computer vision, 115(3 2015.
Tim Salimans and Durk P Kingma. Weight normalization: A simple reparameterization to accelerate training of deep neural networks. In Advances in Neural Information Processing Systems 2016.
Mark Sandler, Andrew Howard, Menglong Zhu, Andrey Zhmoginov, and Liang-Chieh Chen. Mobilenetv2: Inverted residuals and linear bottlenecks. In Proceedings of the IEEE Conference on Computer Vision and Pattern Recognition 2018.
Sanghyun Woo, Jongchan Park, Joon-Young Lee, and In So Kweon. Cbam: Convolutional block attention module. In Proceedings of the European Conference on Computer Vision (ECCV) 2018.
Bichen Wu, Alvin Wan, Xiangyu Yue, Peter Jin, Sicheng Zhao, Noah Golmant, Amir Gholaminejad, Joseph Gonzalez, and Kurt Keutzer. Shift: A zero flop, zero parameter alternative to spatial convolutions. In Proceedings of the IEEE Conference on Computer Vision and Pattern Recognition 2018.
Lei Wu, Zhanxing Zhu, et al. Towards understanding generalization of deep learning: Perspective of loss landscapes. arXiv preprint arXiv:1706.10239 2017.
Saining Xie, Chen Sun, Jonathan Huang, Zhuowen Tu, and Kevin Murphy. Rethinking spatiotemporal feature learning: Speed-accuracy trade-offs in video classification. In Proceedings of the European Conference on Computer Vision (ECCV) 2018.

* cited by examiner

METHODS AND SYSTEMS FOR TRAINING CONVOLUTIONAL NEURAL NETWORK USING BUILT-IN ATTENTION

CROSS-REFERENCE TO RELATED APPLICATIONS

The present disclosure claims priority from U.S. provisional patent application No. 62/934,744, entitled "METHODS AND SYSTEMS FOR TRAINING CONVOLUTIONAL NEURAL NETWORK USING BUILT-IN ATTENTION", filed Nov. 13, 2019, the entirety of which is hereby incorporated by reference.

FIELD

The present disclosure relates to artificial neural networks, including convolutional neural networks and training thereof.

BACKGROUND

Convolutional neural networks (CNNs) are based on convolution operations performed using convolution kernels in a convolutional layer. A convolution kernel comprises a set of weights, and training a CNN involves learning the appropriate weight values at different weight locations throughout the CNN. If the weights are not properly trained (e.g., high value weights are misplaced by training), then the trained CNN will perform with less accuracy.

For a deep CNN, there may be many layers, and many kernels to learn for each layer, meaning there may be a very large number of weights to learn. During training, it may be assumed that at least some weights will be misplaced. It would not be appropriate to optimize placement of all weights, for example due to the problem of overfitting as well as the high computing power required. Thus, there is a problem of how to focus CNN training on weights that are more important.

SUMMARY

In various examples, the present disclosure describes methods and systems that helps to improve accuracy of a trained CNN, by identifying important weights and focusing training of a CNN on those important weights. The disclosed examples may be integrated into the training of various existing convolutional neural network architectures.

In some aspects, the present disclosure describes a method for updating weights of a set of convolution kernels of a convolutional layer of a convolutional neural network during training of the neural network. The method includes obtaining the set of convolution kernels of the convolutional layer. The method also includes generating a set of convolution kernels having attention-infused weights by performing at least one of: applying a set of location-based attention multipliers to weights in the set of convolution kernels; or applying a magnitude-based attention function to the weights in the set of convolution kernels. The method also includes performing convolution on an input activation map using the set of convolution kernels with attention-infused weights to generate an output activation map; and updating attention-infused weights in the set of convolution kernels using a back propagated gradient of a loss computed for the neural network.

In any of the examples, the set of location-based attention multipliers may be applied to the weights in the set of convolution kernels, to obtain a set of location-excited weights, and the magnitude-based attention function may be applied to the set of location-excited weights.

In any of the examples, the method may also include, prior to computing the loss for the neural network, applying a channel-based attention function to the output activation map.

In any of the examples, applying the set of location-based attention multipliers may include learning the set of location-based attention multipliers.

In any of the examples, learning the set of location-based attention multipliers may include: performing average pooling to obtain an averaged weight for each convolution kernel; feeding the averaged weights of the convolution kernels through one or more fully connected layers, to learn the attention multiplier for each convolution kernel; and expanding the attention multiplier across all weights in each respective convolution kernel to obtain the set of location-based attention multipliers.

In any of the examples, feeding the averaged weights of the convolution kernels through the one or more fully connected layers may include: feeding the averaged weights of the convolution kernels through a first fully connected layer; applying, to an output of the first fully connected layer, a first activation function; feeding an output of the first activation function to a second fully connected layer; and applying, to an output of the second fully connected layer, a second activation function.

In any of the examples, the magnitude-based attention function may apply greater attention to weights of greater magnitude, and lesser attention to weights of lesser magnitude.

In any of the examples, the magnitude-based attention function may be:

$$w_A = f_A(w_m) = M_A * 0.5 * \ln\frac{1 + w_m/M_A}{1 - w_m/M_A}$$

where $w_m$ is a weight for a convolution kernel, $w_A$ is the weight after applying magnitude-based attention, $M_A = (1+\in_A)*M$, $M$ is the maximum of all $w_m$ in a convolutional layer and $\in_A$ is a hyperparameter with a selected small value.

In any of the examples, the method may include: prior to applying the set of location-based attention multipliers or the magnitude-based attention function, standardizing the weights in the set of convolution kernels.

In some aspects, the present disclosure describes a processing system including a processing device and a memory storing instructions which, when executed by the processing device, cause the system to perform any of the methods described herein.

In some aspects, the present disclosure describes a computer-readable medium having instructions tangibly stored thereon. The instructions, when executed by a processing device of a processing system, causes the processing system to perform any of the methods described herein.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In examples described herein, performance of a neural network, such as a convolutional neural network (CNN), that includes one or more convolution blocks, is trained in accordance with the present disclosure may be improved, with little or no additional computation cost.

A neural network, such as a CNN, that includes one or more convolution blocks, is trained in accordance with examples disclosed herein. The convolution block of the present disclosure may be implemented within any neural network, such as a CNN. For simplicity, the present disclosure will refer to the convolution block by itself, however it should be understood that the one or more convolution blocks may be part of a larger neural network, such as a CNN, and training of the neural network includes optimizing the weights of the set of convolution kernels of each convolution block in the neural network. In the context of the present disclosure, a convolution block includes a convolutional layer, and may have additional layers such as a pooling layer and an activation layer. Further, the present disclosure may use the term CNN to include deep CNN.

Examples described herein may be applicable for training CNNs to perform various tasks including object classification, object detection, semantic segmentation, gesture recognition, action recognition, and other applications, such as image processing or computer vision applications, where CNNs may be used.

In various examples, the present disclosure describes identifying important weights within a set of convolution kernels of a convolution block of neural network, such as CNN, based on particular characteristics, including the magnitude of a weight in the set of convolution kernels, and/or the location of a weight in the set of convolution kernels. In some examples, the location of a weight may refer to the layer in which the convolution kernel containing that weight is found in the neural network. On the basis that some weights in the set of convolution kernels of a convolution block are more important than other weights, the present disclosure also describes example methods to focus on or provide attention to the more important weights of the set of convolution kernels during training of a neural network that includes one or more of the convolution blocks of the present disclosure. After the neural network has been trained for a specific task and the appropriate weights of the neural network, including the weights of the set of convolution kernels in each convolution block in the neural network, have been learned, the learned weights may be fixed and the trained neural network may be deployed and used to perform the specific task for which it has been trained on new data (e.g., new digital images or point clouds).

The present disclosure describes examples for training a neural network, such as a CNN, that includes one or more convolution blocks, by applying greater attention to weights of a set of convolution kernels of each convolution block that are considered to be more important due to their location (e.g., depending on the channel in which the weights of the set of convolution kernels are found). The present disclosure also describes examples for training a neural network, such as CNN, by applying greater attention to weights of the set of convolution kernels of each convolution block that are considered to be more important due to their magnitude (e.g., greater attention being applied to weights of greater magnitude). The location-based and magnitude-based attention may be applied separately, or in combination. Attention may also be applied on the basis of other characteristics. For example, more attention may be applied to weights that are associated with larger gradient magnitudes (e.g., calculated based on a loss function and used for optimizing the weights during backpropagation). In another example, more attention may be applied to a defined pattern of weights of the set of convolution kernels of a convolution block (e.g., greater attention applied to weights in a set of convolution kernels that match a defined pattern in a convolutional layer of the convolution block in a neural network). It should be understood that the present disclosure is not necessarily limited to location-based and/or magnitude-based attention mechanisms.

Neural networks, such as a CNN, that include one or more convolution blocks and that are trained in accordance with examples of the present disclosure have been found to have improvements over baseline performance of neural networks that include the one or more convolution blocks that have been trained using some existing approaches to neural network training, on a number of computer vision tasks such as image classification and semantic segmentation. Such improvements may be possible with little or no extra computation cost or memory usage during inference.

As will be discussed further below, examples of the methods disclosed herein apply attention to weights of a set of convolution kernels of a convolutional layer, and may be used together with existing methods that apply attention to convolution outputs generated by the convolutional layer (e.g., that apply attention to part of the output activation that may generated by the convolutional layer as done by a Squeeze-and-Excitation block).

Existing methods of training a neural network have not attempted to identify important weights of a set of convolution kernels of a convolution block for optimization during backpropagation, and have not attempted to focus training on reducing misplacement (or mis-learning) of more important weights of a set of convolution kernels of a convolutional layer.

Some existing approaches for training a neural network (e.g., see Siyuan Qiao et al., "Weight standardization", arXiv preprint arXiv:1903.10520, 2019; Tim Salimans et al., "Weight normalization: A simple reparameterization to accelerate training of deep neural networks", Advances in Neural Information Processing Systems, pages 901-909, 2016; and Takeru Miyato et al, "Spectral normalization for generative adversarial networks" arXiv preprint arXiv: 1802.05957, 2018) includes weight reparameterization techniques that are aimed at making an optimization algorithm easier to converge to an optimal solution (i.e., better performing network for the specific task). For example, weight standardization reparameterizes weights in a way that the Lipschitz constant of the loss and the gradients get reduced, resulting in a smoother loss function (i.e., being continuous and having slowly changing differentials) and a more stable optimal solution. With a more stable optimal solution, weight values are less likely to be misplaced severely and the neural network, such as a CNN, is trained to an optimal solution with a good minima. However, such methods for training a neural network, such as a CNN, do not attempt to identify important weights in a set of convolution kernels of a convolutional layer or focus on reducing misplacement of the important weights in a set of convolution kernels of a convolutional layer.

In some examples, the disclosed methods and systems that identify more important weights in a set of convolution kernels of a convolutional layer may be used to improve future techniques for weight reparameterization.

Other existing methods for training a CNN that includes one or more convolutional layers involve attention mechanisms that apply attention to particular parts of the output activation maps generated by a convolutional layer of a CNN (e.g., see Jie Hu et al, "Squeeze-and-excitation networks", Proceedings of the IEEE conference on computer vision and pattern recognition, pages 7132-7141, 2018; Irwa Bello et al, "Attention augmented convolutional networks", arXiv preprint arXiv:1904.09925, 2019; Jongchan Park et al, "Bam: Bottleneck attention module", arXiv preprint arXiv: 1807.06514, 2018; Sanghuyn Woo et al., "Cbam: Convolutional block attention module", Proceedings of the European Conference on Computer Vision (ECCV), pages 3-19, 2018). Such existing methods typically do not have much control on providing focus to a particular weight in a convolution kernel—for example, in Squeeze-and-Excitation blocks of a CNN, an excited channel of an output activation map leads to attention being provided to all the weights that contributed to generating that channel of the output activation map. Additionally, such activation-attention providing methods typically require additional feature memory, extra computation cost and/or changes to the architecture of a CNN during runtime.

In various examples, the present disclosure describes mechanisms for providing attention to weights (also referred to as "weight excitation") in a set of convolution kernels of a convolutional layer that directly target weights in the set of convolution kernels that are more likely to be important during training of a neural network (e.g. a CNN) that includes the convolutional layer. Little or no additional computation cost or structural change may be required at runtime. Furthermore, the attention mechanisms described herein may be added to an existing convolutional layer of a neural network relatively easily, by modifying the convolutional layer within the neural network.

In the present disclosure, the term "weight excitation" may be used to refer to the process of giving more attention to or emphasizing the learning (i.e. optimizing) of a weight in a set of convolution kernels of a convolutional layer, during the training of a neural network, such as CNN, that includes the convolutional layer. A "weight excitation mechanism" may be any mechanism that is designed to give more attention to (or excite) a weight in a set of convolution kernels of a convolutional layer. In some contexts, "attention" and "attention mechanism" may be terms that could be used instead of "excitation" and "excitation mechanism".

A system that may be used in examples disclosed herein is first described.

Figure 1:
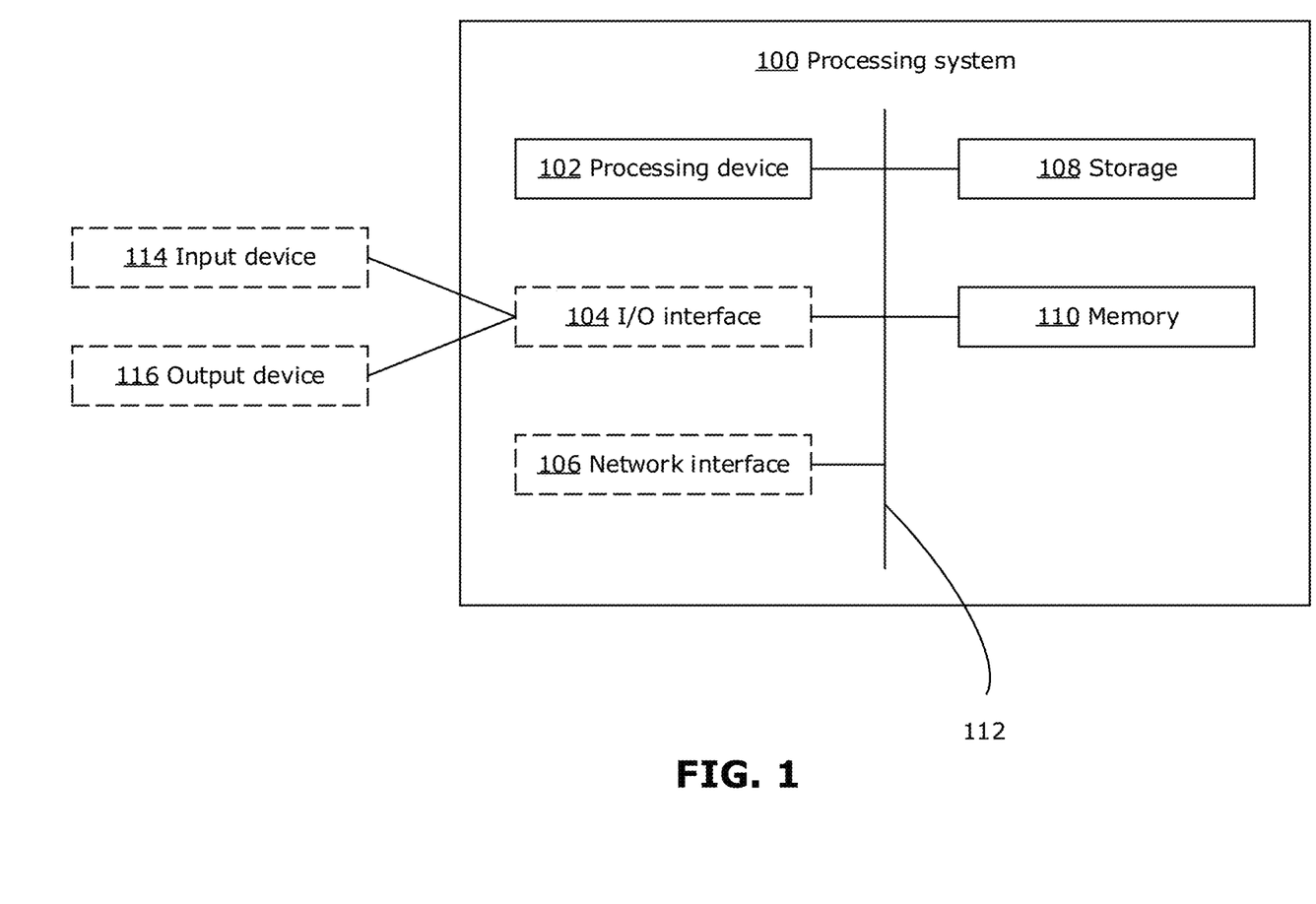
FIG. 1 is a block diagram of an example processing system that may be used to implement examples described herein.

FIG. 1 a block diagram of an example simplified processing system 100, which may be part of a system that is used to perform operations of a convolutional layer of a neural network, including convolution operations, in accordance with examples disclosed herein. Other processing systems suitable for implementing embodiments described in the present disclosure may be used, which may include components different from those discussed below. Although FIG. 1 shows a single instance of each component, there may be multiple instances of each component in the processing system 100.

The processing system 100 may include one or more processing devices 102, such as a processor, a microprocessor, an application-specific integrated circuit (ASIC), a field-programmable gate array (FPGA), a dedicated logic circuitry, a dedicated artificial intelligence processor unit, or combinations thereof. The processing system 100 may also include one or more optional input/output (I/O) interfaces 104, which may enable interfacing with one or more optional input devices 114 and/or optional output devices 116.

In the example shown, the input device(s) 114 (e.g., a keyboard, a mouse, a microphone, a touchscreen, and/or a keypad) and output device(s) 116 (e.g., a display, a speaker and/or a printer) are shown as optional and external to the processing system 100. In other examples, one or more of the input device(s) 1914 and/or the output device(s) 116 may be included as a component of the processing system 100. In other examples, there may not be any input device(s) 114 and output device(s) 116, in which case the I/O interface(s) 104 may not be needed.

The processing system 100 may include one or more optional network interfaces 106 for wired or wireless communication with a network (e.g., an intranet, the Internet, a P2P network, a WAN and/or a LAN) or other node. The network interfaces 106 may include wired links (e.g., Ethernet cable) and/or wireless links (e.g., one or more antennas) for intra-network and/or inter-network communications.

The processing system 100 may also include one or more storage units 108, which may include a mass storage unit such as a solid state drive, a hard disk drive, a magnetic disk drive and/or an optical disk drive. The processing system 100 may include one or more memories 110, which may include a volatile or non-volatile memory (e.g., a flash memory, a random access memory (RAM), and/or a read-only memory (ROM)). The non-transitory memory(ies) 110 may store instructions for execution by the processing device(s) 102, such as to carry out examples described in the present disclosure. The memory(ies) 110 may include other software instructions, such as for implementing an operating system and other applications/functions. In some examples, memory 110 may include software instructions for execution by the processing device 102 to train a neural network and/or to implement a trained neural network, as disclosed herein.

In some other examples, one or more data sets and/or modules may be provided by an external memory (e.g., an external drive in wired or wireless communication with the processing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 112 providing communication among components of the processing system 100, including the processing device(s) 102, optional I/O interface(s) 104, optional network interface(s) 106, storage unit(s) 108 and/or memory(ies) 110. The bus 112 may be any suitable bus architecture including, for example, a memory bus, a peripheral bus or a video bus.

Although FIG. 1 illustrates a processing system 100 for performing the operations of a convolutional layer that includes built-in attention during training of a neural network, any physical machine (e.g., physical computer, including a server or distributed computer), may perform the operations of a convolutional layer that includes built-in attention of the present disclosure. Further, one or more virtual machines (e.g., provided by a cloud computing provider) may perform the operations of a convolutional layer that includes built-in attention of the present disclosure.

Figure 2:
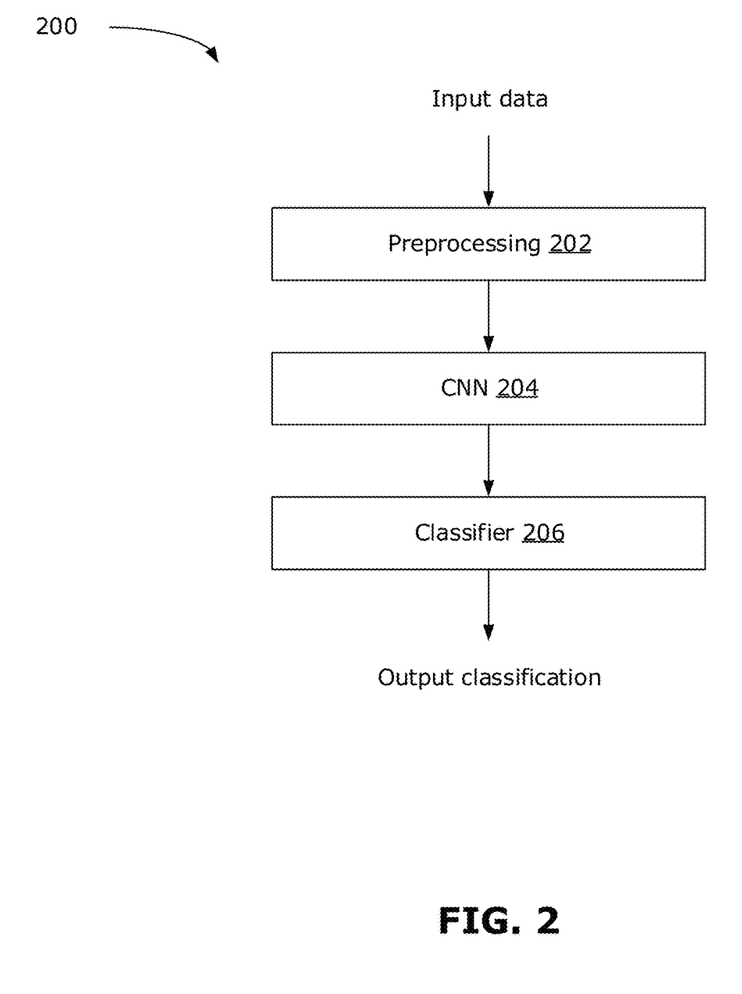
FIG. 2 is a schematic diagram of an example architecture for a neural network, such as a CNN.

FIG. 2 illustrates a block diagram of an example neural network 200, which includes a CNN 204 and a fully connected network (such as a classifier 206). The neural network 200 in this example is designed for performing an object classification task. The neural network 200 has been simplified, is not intended to be limiting and is provided for the purpose of illustration only. The input data to the neural network 200 may be, for example, image data or video data. The neural network 200 includes a preprocessing block 202, which may perform various operations (e.g., normalization) on the input data to generate pre-processed data (e.g. an input activation map) for input to the CNN 204. The CNN 204 includes one or more convolutional layers (not shown). The CNN 204 receives an input activation map (e.g., the preprocessed data) and the convolutional layers perform convolution operations, using a set of convolution kernels (each convolution kernel being used for convolution of a respective channel in a respective convolutional layer), to generate an output activation map. As will be discussed further below, a convolution kernel (which may also be referred to as a filter kernel or simply filter) includes weights. Training of the neural network 200 is performed using a training dataset comprising samples of labelled input data in order to learn (i.e. optimize) the weights of the neural network 200, including the weights in for each convolution kernel of each convolutional layer in the CNN 204. The output activation map is provided to a fully connected neural network, referred to as a classifier 206 in this example, which may then output an indication of a class (i.e. category) of an object represented by the input data. The indication of the class is selected by the classifier 206 from a set of classes based on a probability value predicted for each class in the set of classes predicted by the fully connected network (e.g. the classifier 206). The indication of the class output by the classifier 206 is generally referred to as a label. The neural network 200 may be trained end-to-end. For example, sampled training data may be received by the preprocessing block 202 and the resulting activation map forward propagated through the layers of the CNN 204 and finally the layers of the fully connected network (e.g., the classifier 206), to generate the output label. A loss is calculated from the output using a loss function, and the gradient of the loss is calculated. The gradient is used to update (i.e., optimize) the weights of each layer of the neural network 200 using backpropagation. This end-to-end training may be performed over multiple iterations until a desired convergence condition is reached (e.g., the weights have converged on an optimal solution). The weights may then be fixed, and the trained neural network 200 may be deployed to perform the task for which it has been trained (e.g., a classification task).

Although FIG. 2 the CNN 204 as part of a neural network 200 having a classifier 206, it should be understood that the present disclosure may be applicable to training of any neural network, having convolutional layers with convolution kernels. For example, the CNN 204 may be trained (e.g., as a standalone neural network) to perform any machine-learning task, using the methods described herein.

The above discussion provides an example that illustrates how a CNN 204 may be part of a trained neural network for performing a specific task during inference. In general the input data may have one, two or three (or more) dimensions, and the output may have any suitable format, depending on the application.

In order for the neural network 200 to perform the specific task with a desired degree of accuracy, the method used for training of the neural network 200 is important.

Figure 3A:
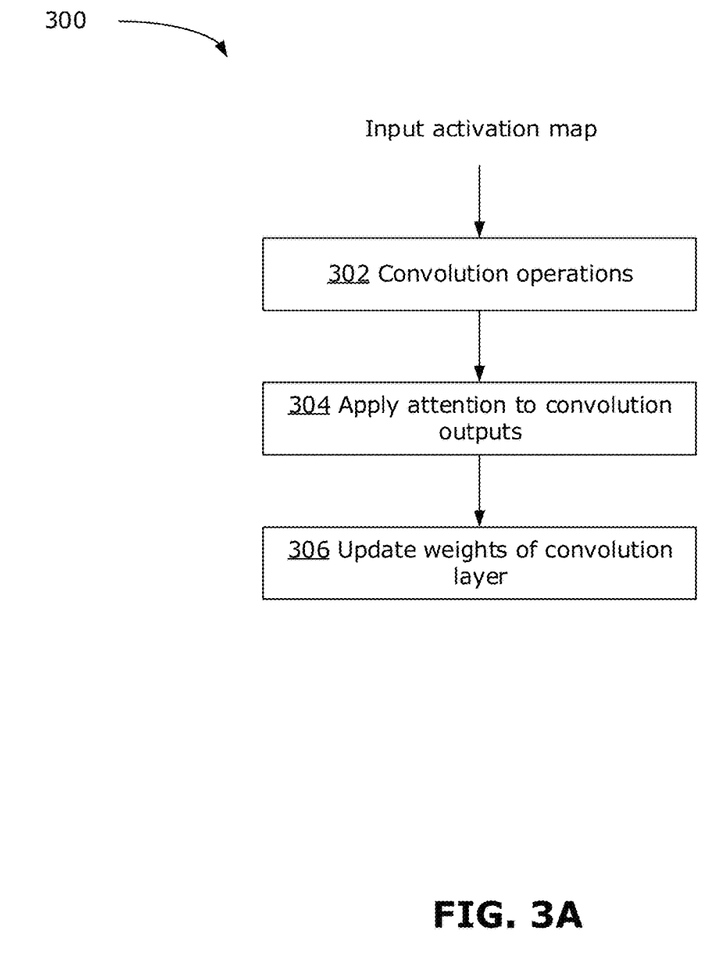
FIG. 3A shows example operations that may be performed by a Squeeze-and-Excitation block.

FIG. 3A is a flowchart that illustrates an example method 300 that that is performed by a convolutional layer of Squeeze-and-Excitation block. The method 300 is a simplification of the operations performed by a convolutional layer of the Squeeze-and-Excitation block, in which attention is applied to the convolution outputs (e.g. the output attention map) generated by the convolution operations performed by a convolutional layer of the Squeeze-and-Excitation block. Generally, an input activation map is received by a convolutional layer of Squeeze-and-Excitation block. At 302, convolution operations are performed by a convolutional layer of Squeeze-and-Excitation block. The weights in the convolution kernels of the convolutional layer of the Squeeze-and-Excitation block are used for the convolution operations without focusing attention on specific more important weights among the convolution kernels. The convolution operations receive a first number of input channels of the input activation map and output a second number of output channels of the output activation map. At 304, attention is applied to the convolution outputs generated by the convolution operations performed by a convolutional layer of a Squeeze-and-Excitation block. In the convolutional layers of a Squeeze-and-Excitation block, attention is applied by applying different weights to the output channels of the output activation map using a channel-based attention function, thus scaling each output channel of the output activation map based on its relative importance compared to each other output channel of the output activation map. Notably, the attention is not applied directly to the weights in the convolution kernels. The output activation map, with channel-based attention applied, may be further processed by a fully connected layer to generate an output (e.g., a classification label). The output may be compared with a ground-truth label, to compute a loss using a loss function. At 306, the weights of a convolutional layer of the Squeeze-and-Excitation block are updated, by backpropagating the gradient of the computed loss.

Figure 3B:
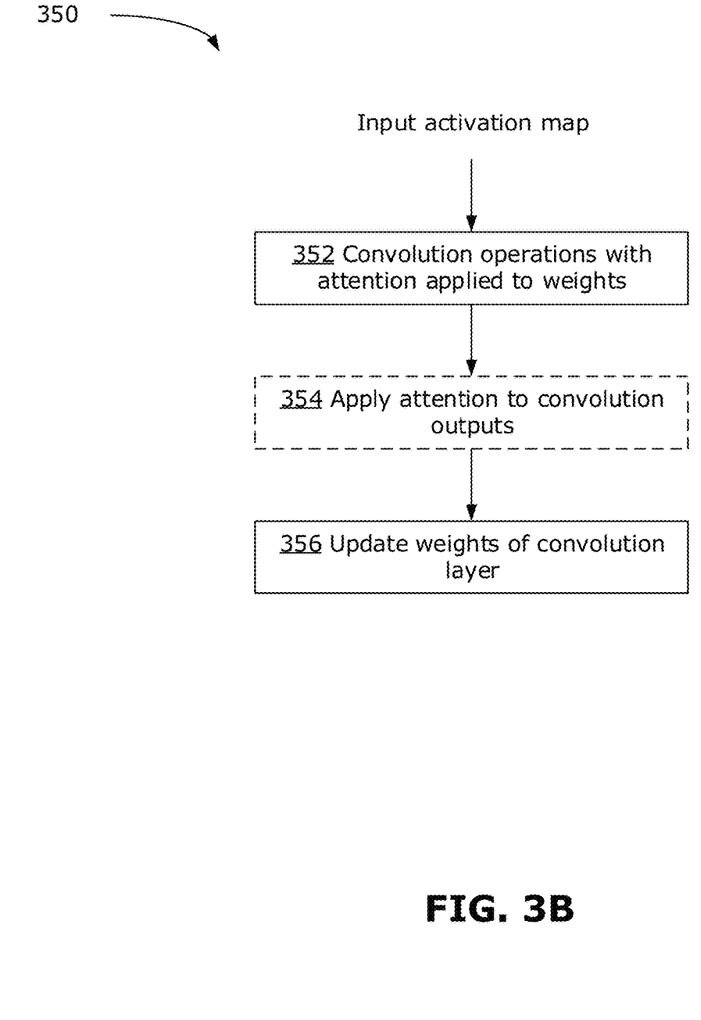
FIG. 3B shows example operations that may be performed by a convolution block of a CNN, in accordance with the present disclosure.

FIG. 3B is a flowchart that illustrates an example method 350 that is performed by a convolutional layer of the present disclosure during training of a CNN that includes the convolutional layer of the present disclosure. The convolutional layer of the present disclosure includes a built-in attention mechanism that applies attention to weights in the set of convolution kernels of the convolutional layer, in accordance with the present disclosure. In contrast to the method 300 that is performed by a convolutional layer of a Squeeze-and-Excitation block described above with respect to FIG. 3A, the method 350 of the present disclosure applies attention directly to the weights in the set of convolution kernels of the convolutional layer of a CNN.

Similar to the method 300, the convolutional layer may be a layer in any convolutional block of any neural network (e.g., a CNN), and the input activation map that is inputted into the convolutional layer may be, for example, the output of a previous layer (e.g., an activation map generated by a preprocessing layer, an activation map generated by a pooling layer, an activation map generated by an activation layer) of the neural network.

At 352, convolution operations are performed using convolutional layers with built-in attention. Because the attention is applied to weights of the convolution kernel of the convolutional layer (as opposed to being applied to the convolution outputs (e.g. the output activation map generated by of the convolutional layer), this method may be referred to as "built-in" attention. In the present disclosure, different attention mechanisms (described in greater detail below) are described to enable more attention to be applied to weights in a set of convolution kernels that are considered to be more important. A more important weight in the convolution kernels of a convolutional layer is a weight that is expected to contribute more to the performance of the neural network and hence a weight that should be more optimized during training. Conversely, a less important weight in a set of convolution kernels of a convolutional layer is a weight that is expected to have less contribution to the performance of the neural network and hence does not have to be well-learned. The weights, in the set of convolution kernels, that have built-in attention applied in this manner may be referred to as attention-infused weights.

At 354, optionally, attention may also be applied to the convolution outputs (e.g. the output activation map generated using the convolution operations). The attention that is applied at 354 may be applied using a channel-based attention function, similar to the attention applied at 304 above, such as used in the Squeeze-and-Excitation neural network. Thus, the built-in attention described in the present disclosure may be used together with and complementary with existing approaches to attention-based learning that applies attention to the convolution outputs (e.g. output activation map) of a convolutional layer.

The resulting output activation map may then be further processed by a fully connected layer (e.g., a classifier) to generate an output (e.g., a classification label). The output may be compared with a ground-truth label, to compute a loss using a loss function. At 356, the attention-infused weights of the convolutional layer of the neural network are updated, by backpropagating the gradient of the computed loss (e.g., using a backpropagation of errors algorithm) using gradient descent or gradient ascent. Notably, because attention has been applied to the more important weights of the convolution kernels of convolutional layers directly, the loss calculated using a loss function and the backpropagation will be more focused on optimizing those more important weights.

After the neural network (e.g., CNN) has been trained and the weights of the neural network are learned (i.e. optimized) to achieve the desired degree of accuracy for the CNN for the specific task for which it has been trained, the neural network may be deployed and used to perform the specific task for which it has been trained during inference on new input data (e.g. new images, point clouds, etc.).

A weight of a convolution kernel of a convolutional layer of a neural network (e.g., CNN) may be considered to be a more important weight (compared to other weights in the CNN) based on its magnitude. Generally, a baseline convolution operation performed by a convolutional layer in a CNN can be represented as:

$$y_i = W_i \circledast x$$

where $y_i$ is the ith output channel of the convolutional layer, x is the input (e.g., 1D, 2D or 3D (or higher dimension) activation map), $\circledast$ is the convolution operator and $W_i$ is the ith convolution kernel. $W_i$ has a dimension of In×h×w, where In is the number of input channels in the input activation map, and h and w are the height and width respectively of the convolution kernel. Assuming x is non-zero, it has been found that zeroing the largest magnitude weight of $W_i$ will result in a larger change in $y_i$ (mathematically denoted as $\nabla y_i$) than if the smallest magnitude weight of $W_i$ is zeroed. This indicates that higher magnitude weights in $W_i$ contribute more to convolution outputs of a convolution operation. Accordingly, higher magnitude weights in $W_i$ are likely to have a greater effect on the performance (e.g., accuracy) of a trained CNN than lower magnitude weights in $W_i$. Thus, higher magnitude weights in $W_i$ are considered to be more important than lower magnitude weights in $W_i$.

Another characteristic that may lead to a weight being considered to be more important is the location of the weight in the CNN (e.g., the specific convolutional layer and convolution kernel to which the weight belongs). A previous study (Jie Hu et al., 2018, cited previously) of the Squeeze-and-Excitation block found that some convolutional layers in a Squeeze-and-Excitation-based CNN (e.g. a CNN that includes a Squeeze-and-Excitation block) tend to place attention on some output channels of the output activation map generated by a convolutional layer of the Squeeze-and-Excitation more than others channels of the output activation map, almost independent to the input activation map to those convolutional layers. This finding suggests that some output channels of the output activation map (and thus all weights in the convolutional layer responsible for generating that output channel of the output activation map) become more important than others output channels during training of the Squeeze-and-Excitation-based CNN. Accordingly, weights may have different levels of importance depending on the location or input channel to which a weight belongs.

Other characteristics may be used to determine whether some weights in a set of convolution kernels should be considered more important than others. For example, weights that are associated with greater magnitude gradients during training may be considered more important than other weights that are associated with lesser magnitude gradients. In another example, weights that are found at defined locations or that match a defined pattern in a convolutional layer of the CNN may be considered to be more important.

The present disclosure describes weight excitation mechanisms that enable more attention to be applied to certain weights in a set of convolution kernels of a convolutional layer of a CNN, based on some characteristic that is linked with the importance of those weights. Because the importance of a weight has been found, in some cases, to be dependent on its magnitude and/or location characteristics, the present disclosure describes weight excitation mechanisms based on each of these two characteristics. One weight excitation mechanism is referred to herein as location-based weight excitation (LWE), and another weight excitation mechanism is referred to herein as magnitude-based weight excitation (MWE). Generally, to excite an important weight $w_j$, a relatively larger magnitude gain $G_j$ is applied to the weight $w_j$, compared to the magnitude gain provided to other weights. Because backpropagated gradients used for updating the weight $w_j$ also are affected by a gain of $G_j$, the result is that more attention is provided towards properly optimizing the weight $w_j$.

Figure 4:
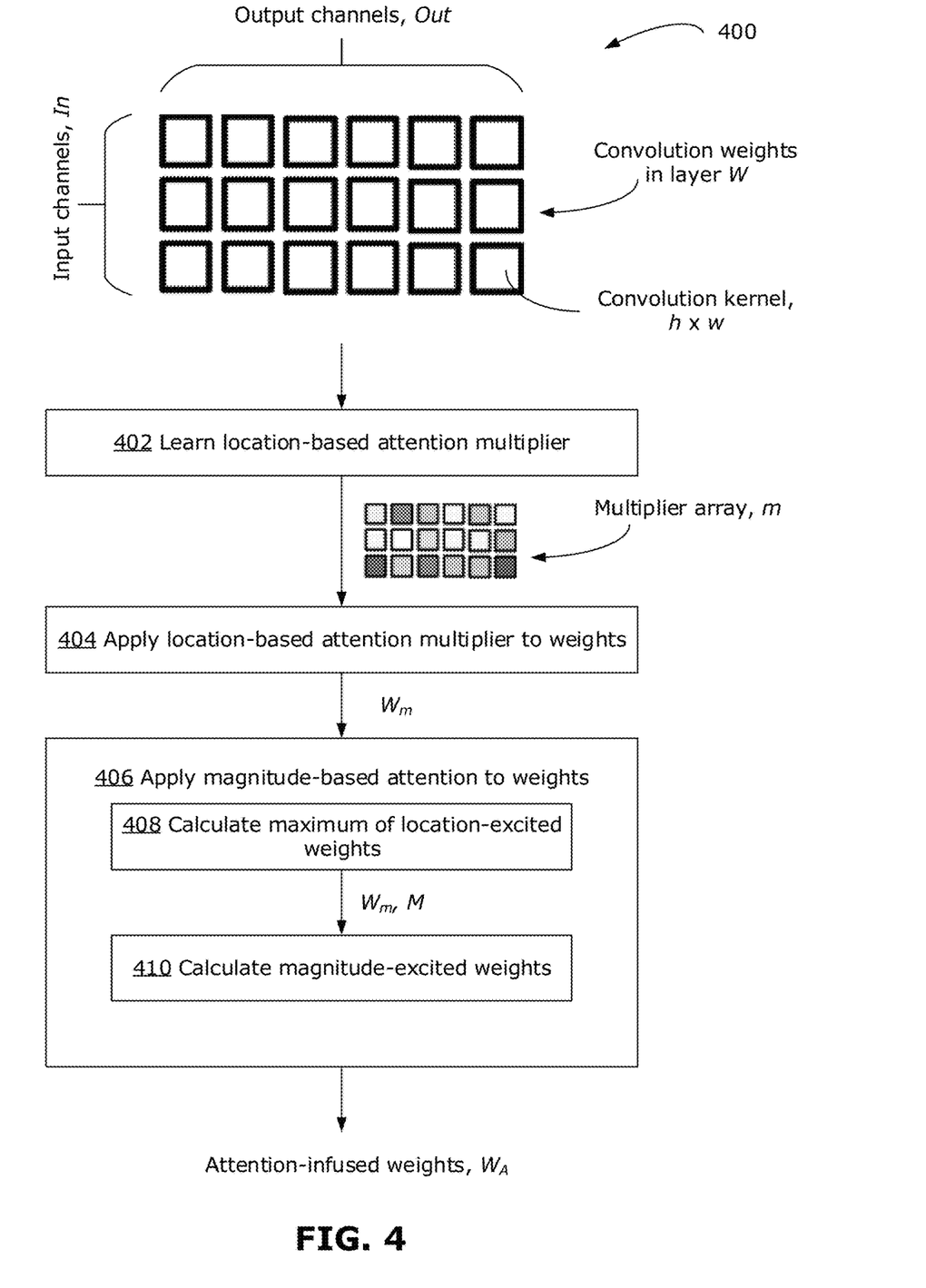
FIG. 4 is a flowchart illustrating an example method for training a neural network having a convolution block, in accordance with the present disclosure.

FIG. 4 is a flowchart illustrating an example method 400 for applying attention to weights in a set of convolution kernels of a convolutional layer, based on defined characteristics of the weights, during training of a CNN that includes one or more convolutional layers. In particular, FIG. 4 illustrates an example method 400 in which location-based attention and magnitude-based attention are applied to weights in a set of convolution kernels of a convolutional, during forward propagation training of the CNN. Because the attention is applied to weights in a convolution kernel of a convolutional layer within the CNN (as opposed to being applied to the convolution output of the convolutional layer of a CNN), this approach may be referred to as "built-in" attention. Compared to the forward propagation method 300 described above, the weight excitation mechanisms described here result in attention being applied directly to weights in the set of convolution kernels themselves, rather than attention being applied to the convolution outputs.

The input activation map to the convolutional layer is a 4D weight tensor (W(Out, In, h, w)). It should be understood that the dimensionality may be different depending on the dimensionality of the input activation map to the convolutional layer. Optionally, the weights W may be standardized across each ith channel of the input activation map, similar to standardizing an input activation map before being fed into a convolutional layer of a CNN. The standardization of the weights in the convolution kernels of the convolutional layer may be calculated as:

$$W_{n,i} = (W_i - \mu_i)/\sigma_i$$

where $W_{n,i}$ is the normalized weights of the ith output channel of the output activation map of the convolutional layer, $\mu_i$ and $\sigma_i$ are the mean and standard deviation, respectively, of the weights in the ith output channel. The result of standardization is a standardized mean of zero and a standardized deviation of 1. Such standardization may be performed to help simplify learning of weights in the convolution kernel of the convolutional layer of the CNN. In some examples, standardization may not be performed (e.g., in some cases, better performance of the trained CNN may be achieved when standardization of the weights in a convolution kernel of a convolutional layer is omitted).

At 402, the location-based attention multiplier m is learned. Details of the sub-network for learning the location-based attention multiplier m will be discussed with reference to FIG. 5. The location-based attention multiplier m in this example is an array of different multiplier values that are applied to respective convolution kernels in the convolutional layer. The size of the location-based attention multiplier m is an array of dimension Out×In. Generally, the higher the magnitude of the multiplier, the greater the attention applied to the weight in the convolution kernel of the convolutional layer.

At 404, the location-based attention multiplier array m is applied to the weights in the convolution kernel of the convolutional layer. Each multiplier $m_i$ in the multiplier array is independently applied to the normalized weights in the convolution kernel for of each channel $W_{n,i}$. In this example, the multiplier may be applied using Hadamard multiplication, such that $$W_{m,i} = (W_{n,i} \circ m_i)$$

where ○ represents the Hadamard multiplication, and $W_{m,i}$ is the weights in the convolution kernel of the ith output channel after application of the location-based attention multiplier. For simplicity, $W_{m,i}$ may also be referred to as the location-excited weights in the convolution kernel of the ith output channel.

As will be discussed further below, the location-based attention multiplier may apply independent multipliers for each convolution kernel of the set of convolution kernels in a convolutional layer. The rationale for independent multipliers $m_i$ being applied to respective convolution kernels in the set of convolution kernels in the convolutional layer is that each of these kernels are located in different parts of the convolutional layer with varying importance in weights in the convolution kernels and thus deserve varying levels of attention.

At 406, magnitude-based attention is applied to the location-excited weights $W_m$. The magnitude-based weight excitation mechanism provides more attention to weights in the set of convolution kernels having higher magnitudes. This involves steps 408 and 410.

At 408, the maximum M of the location-excited weights is calculated.

At 410, the magnitude-excited weights are calculated. An attention function is used for this magnitude-based excitation, discussed further below.

The result of the location-based and magnitude-based excitation is a set of attention-infused weights $W_A$, in which the more important weights (as determined based on location and magnitude characteristics) have been more excited compared to less important weights. The attention-infused weights $W_A$ are used in the convolution operations during training of the CNN, as discussed above with respect to FIG. 3B.

It should be noted that the location-based and magnitude-based weight excitation mechanisms may be only applied during training. After the CNN has been trained, the location-based and magnitude-based weight excitation mechanisms may no longer be used. The disclosed weight excitation mechanisms are not required during inference runtime. This may result in little or no additional computation cost, memory usage and structural changes in the overall network architecture.

Although FIG. 4 shows application of both location-based attention and magnitude-based attention, it should be understood that location-based attention and magnitude-based attention are separate attention mechanisms that may be used independently of each other. For example, only the location-based attention mechanism may be used, in which case step 406 (including steps 408 and 410) may be omitted, and the final set of attention-infused weights is the location-excited weights. In another example, only the magnitude-based attention mechanism may be used, in which case steps 402 and 404 may be omitted. In examples where both the location-based attention mechanism and the magnitude-based attention mechanism are used, the order in which the attention mechanisms are applied may vary (e.g., location-based attention may be applied first, as shown in FIG. 4, or magnitude-based attention may be applied first).

Details of how the location-based attention multiplier is learned are now discussed with reference to FIG. 5. The method 500 of FIG. 5 may be used at step 402 discussed above. Compared to the forward propagation method 300 described above, the location-based weight excitation mechanism described here results in attention being applied directly to the weights of a set of convolution kernels of a convolutional layer, rather than attention being applied to the convolution outputs generated by the convolutional layer (e.g. the output channels of the output activation map generated by the convolutional layer).

The overall operations of the method 500 may be represented as $$m_1 = A_2(FC_2(A_1(FC_1(\text{Avg}(W_{n,i}))))) \quad (1)$$

where $W_{n,i}$ are the weights in the convolution kernel for the ith input channel, which may be standardized; Avg denotes the average pooling operation; $FC_1$ and $FC_2$ are first and second fully connected layers, respectively; $A_1$ and $A_2$ are first and second activation functions (e.g., rectified linear unit (ReLU) and sigmoid functions, respectively); and $m_i$ are the location-based attention multipliers for the ith channel.

Optionally, at 502 the weights in each convolution kernel (i.e., for each input channel) are standardized, as described above, to obtain the standardized weights $W_{n,i}$ (where the subscript i denotes the ith input channel).

At 504, the average pooling operation Avg is performed. Average pooling is an operation that averages all weights (or standardized weights) in the convolutional kernel for the ith input channel to one averaged value, resulting in a In-sized tensor. It should be understood that the average pooling operation may be performed for convolution kernels of any dimensionality (e.g., 1D, 2D, 3D, or higher dimensionality). In the case where convolution is performed using a 1D convolution kernel of size w (i.e., for 1D convolution), the average pooling operation averages all w weights in the convolution kernel to a single averaged value. Similarly, in the case where convolution is performed using a 2D convolution kernel of size h×w (i.e., for 2D convolution), the average pooling operation averages all h×w weights in the convolution kernel to a single averaged value; and in the case where convolution is performed using a 3D convolution kernel of size t×h×w (i.e., for 3D convolution), the average pooling operation averages all t×h×w weights in the convolution kernel to a single averaged value. The average pooling operation may be performed as a form of dimension reduction. This may help to reduce the number of computations, to help improve computing efficient and help simplify learning of the weights of the convolutional layer of the CNN. Other types of dimension reduction operations may be performed instead.

At 506, the averaged weights are fed into the first fully connected layer $FC_1$. The output of the first fully connected layer $FC_1$ is processed at 507 by the first activation function $A_1$. For example, the first activation function $A_1$ may be a rectifier function performed using a ReLU.

At 508, the output of the first activation function $A_1$ is processed by the second fully connected layer $FC_2$. The output of the second fully connecter layer $FC_2$ is processed at 509 by the second activation function $A_2$. For example, the second activation function $A_2$ may be a sigmoid function.

The output from the second activation function $A_2$ is another In-sized tensor. The use of the first and second fully connected layers $FC_1$ and $FC_2$ (and first and second activation functions $A_1$ and $A_2$) enable learning of the relative importance of the weights in the convolution kernel for the ith input channel. The In-sized tensor thus may be used as an attention multiplier for the In convolution kernels.

It may be noted that $FC_1$ and $FC_2$ for all the outputs of a convolutional layer may have shared weights.

Figure 5:
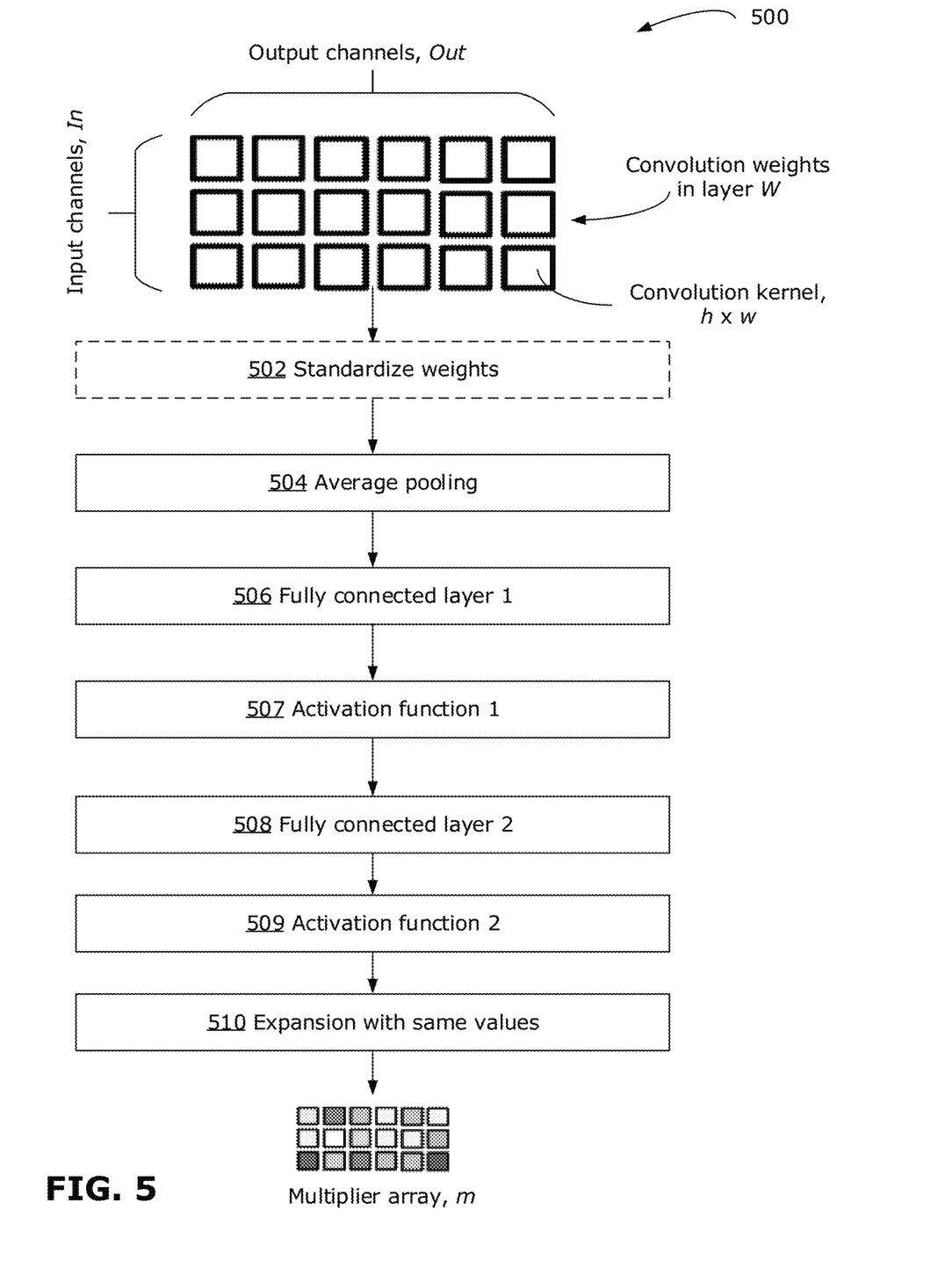
FIG. 5 is a flowchart illustrating an example method for learning a location-based attention multiplier, which may be part of the method of FIG. 4.

Although two fully connected layers are illustrated in FIG. 5, in some examples there may be one fully connected layer, or three (or more) fully connected layers instead. Each fully connected layer may be followed by a respective activation function. Although ReLU and sigmoid function have been described above, it should be understood that any activation function may be independently selected for each fully connected layer. For example, an activation function may be a sigmoid, a rectified linear unit, leaky rectified linear unit function, or any other suitable activation function. The activation function following the fully connected layer(s) may be used for normalizing or regularizing the attention multiplier that will be used by the location-based weight excitation mechanism. Generally, the use of two fully connected layers (with or without a following activation function) may be common for learning classification tasks, and may enable the learning of more complex (e.g., non-linear) relationships among channels.

At 510, the In-sized tensors of each output channel are expanded by value replication according to the dimensionality of the respective convolution kernel (i.e., for each ith convolution kernel). For example, in the case where the kernel is a 2D kernel of size h×w, the In-sized tensors may be expanded to a In×h×w sized tensor $m_i$, to form the multiplier array m.

It may be noted that the above-described process (represented by equation (1)) is performed for each output channel $W_{n,i}$, ultimately generating In different attention multipliers $m_i$ (where i=1, . . . , In).

The multiplier array may then be used to apply location-based attention to weights, at 404 discussed above (e.g., using Hadamard multiplication).

Figure 6:
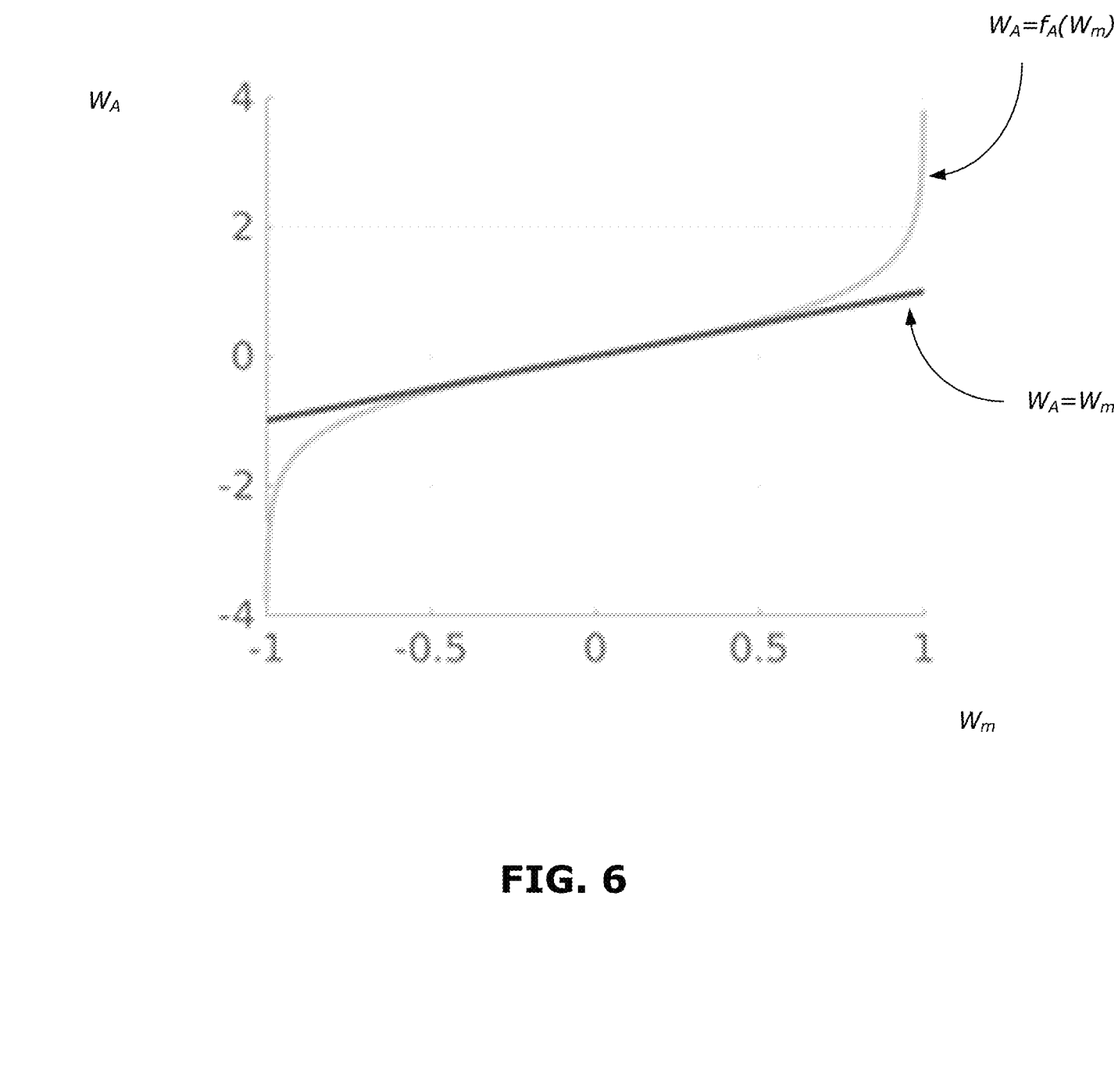
FIG. 6 is a plot illustrating an example function for applying magnitude-based attention to weights, which may be used for the method of FIG. 4.

FIG. 6 is a plot of an example magnitude-based attention function $f_A(w_m)$ that may be used to apply magnitude-based attention. In some contexts, the attention function may also be referred to as an activation function. The attention function takes in individual weight values $w_m$ and provides relatively higher gains G to weights having relatively larger magnitudes than others. In this example, the attention function is $$w_A = f_A(w_m) = M_A * 0.5 * \ln\frac{1 + w_m/M_A}{1 - w_m/M_A} \quad (2)$$

where $M_A = (1+\in_A)*M$, M is the maximum of all $w_m$ in a convolutional layer and $\in_A$ is a selectable hyperparameter with a small value (e.g., $0<\in_A<0.2$). For smaller values of $w_m$ (i.e., smaller magnitude weights), the attention function $f_A$ approximates to an identity line (i.e., $W_A=w_m$). Because the gradient of an identity line is 1, the backward propagated gradients for small values of $w_m$ ($\nabla w_m$) are not affected after applying $f_A$. For larger values of $w_m$ (i.e., larger magnitude weights), gradient gains progressively increase while remaining bounded due to normalization of $w_m$ by $M_A$ (see equation (2)). It should be noted that the value for the hyperparameter $\in_A$ may be selected to control performance of the training (e.g., for faster convergence, depending on sensitivity of the optimizer, etc.). A larger value of $\in_A$ results in the magnitude-based attention function being closer to the identity line (i.e., the effects of magnitude-based attention are smaller), whereas a smaller value of $\in_A$ results in the greater magnitude-based attention effects. In some simulations, $\in_A=0.1$ was found to achieve good performance.

Other attention functions may be used (e.g., $w_A=w_m+w_m^3$, etc.). Generally, the attention function $f_A(w_m)$ should provide higher magnitude gains for larger $w_m$ values, should be differentiable, and avoid vanishing and exploding gradient problems.

In the present disclosure, weight excitation may be performed using a location-based weight excitation mechanism and a magnitude-based weight excitation mechanism. The two excitation mechanisms may be used independently and separately. For example, in the context of FIG. 4, the steps 402 and 404 may be omitted, to obtain attention-infused weights using the magnitude-based weight excitation mechanism only. Conversely, the steps 406-410 may be omitted, to obtain attention-infused weights using the location-based weight excitation mechanism only. Variations of the method 400 have been considered in example studies, which found that location-based weight excitation may have a greater effect on accuracy improvement, compared with magnitude-based weight excitation. However, because the location-based weight excitation mechanism may be calculated on a per-channel basis, the additional use of magnitude-based weight excitation may be useful for shift-based convolutions. In some examples, weight excitation may be performed based on other weight characteristics, as described previously in this disclosure, in addition to or in place of location-based and/or magnitude-based weight excitation.

In various examples, a method of training a CNN using built-in attention, applied directly to the weights, is described. This method has been found to achieve improvement in performance (e.g., accuracy) of the CNN in performing a specific task during inference. At the same time, there is little or no increase in computational effort during inference, because the mechanisms for applying attention to the weights are not needed during inference.

Additionally, since a fully connected layer in a CNN can also be represented as a convolution operation, the built-in attention mechanism disclosed herein can also be applied in various other applications where a fully connected layer is used.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for updating weights of a set of convolution kernels of a convolutional layer of a neural network during training of the neural network, the method comprising:
obtaining the set of convolution kernels of the convolutional layer;
generating a set of convolution kernels having attention-infused weights by performing at least one of:
applying a set of location-based attention multipliers to weights in the set of convolution kernels; or
applying a magnitude-based attention function to the weights in the set of convolution kernels;
performing convolution on an input activation map using the set of convolution kernels with attention-infused weights to generate an output activation map; and
updating the attention-infused weights in the set of convolution kernels using a back propagated gradient of a loss computed for the neural network.

2. The method of claim 1, wherein the set of location-based attention multipliers is applied to the weights in the set of convolution kernels, to obtain a set of location-excited weights, and wherein the magnitude-based attention function is applied to the set of location-excited weights.

3. The method of claim 1, further comprising:
prior to computing the loss for the neural network, applying a channel-based attention function to the output activation map.

4. The method of claim 1, wherein applying the set of location-based attention multipliers further comprises:
learning the set of location-based attention multipliers.

5. The method of claim 4, wherein learning the set of location-based attention multipliers comprises:
performing average pooling to obtain an averaged weight for each convolution kernel;
feeding the averaged weights of the convolution kernels through one or more fully connected layers, to learn the attention multiplier for each convolution kernel; and
expanding the attention multiplier across all weights in each respective convolution kernel to obtain the set of location-based attention multipliers.

6. The method of claim 5, wherein feeding the averaged weights of the convolution kernels through the one or more fully connected layers comprises:
feeding the averaged weights of the convolution kernels through a first fully connected layer;
applying, to an output of the first fully connected layer, a first activation function;
feeding an output of the first activation function to a second fully connected layer; and
applying, to an output of the second fully connected layer, a second activation function.

7. The method of claim 1, wherein the magnitude-based attention function applies greater attention to weights of greater magnitude, and lesser attention to weights of lesser magnitude.

8. The method of claim 7, wherein the magnitude-based attention function is $$w_A = f_A(w_m) = M_A * 0.5 * \ln\frac{1 + w_m/M_A}{1 - w_m/M_A}$$

where $w_m$ is a weight for a convolution kernel, $W_A$ is the weight after applying magnitude-based attention, $M_A = (1+\in_A)*M$, M is the maximum of all $W_m$ in a convolutional layer and $\in_A$ is a hyperparameter with a selected small value.

9. The method of claim 1, further comprising:
prior to applying the set of location-based attention multipliers or the magnitude-based attention function, standardizing the weights in the set of convolution kernels.

10. A processing system comprising a processing device and a memory storing instructions which, when executed by the processing device, cause the processing system to update weights of a set of convolution kernels of a convolutional layer of a convolutional neural network during training of the neural network by:
obtaining the set of convolution kernels of the convolutional layer;
generating a set of convolution kernels having attention-infused weights by performing at least one of:
applying a set of location-based attention multipliers to weights in the set of convolution kernels; or
applying a magnitude-based attention function to the weights in the set of convolution kernels;
performing convolution on an input activation map using the set of convolution kernels with attention-infused weights to generate an output activation map; and
updating the attention-infused weights in the set of convolution kernels using a back propagated gradient of a loss computed for the neural network.

11. The processing system of claim 10, wherein the set of location-based attention multipliers is applied to the weights in the set of convolution kernels, to obtain a set of location-excited weights, and wherein the magnitude-based attention function is applied to the set of location-excited weights.

12. The processing system of claim 10, wherein the instructions further cause the processing system to:
prior to computing the loss for the neural network, apply a channel-based attention function to the output activation map.

13. The processing system of claim 10, wherein the instructions further cause the processing system to apply the set of location-based attention multipliers further by:
learning the set of location-based attention multipliers.

14. The processing system of claim 13, wherein the instructions further cause the processing system to learn the set of location-based attention multipliers by:
performing average pooling to obtain an averaged weight for each convolution kernel;
feeding the averaged weights of the convolution kernels through one or more fully connected layers, to learn the attention multiplier for each convolution kernel; and
expanding the attention multiplier across all weights in each respective convolution kernel to obtain the set of location-based attention multipliers.

15. The processing system of claim 14, wherein the instructions further cause the processing system to feed the averaged weights of the convolution kernels through the one or more fully connected layers by:
feeding the averaged weights of the convolution kernels through a first fully connected layer;
applying, to an output of the first fully connected layer, a first activation function;
feeding an output of the first activation function to a second fully connected layer; and
applying, to an output of the second fully connected layer, a second activation function.

16. The processing system of claim 10, wherein the magnitude-based attention function applies greater attention to weights of greater magnitude, and lesser attention to weights of lesser magnitude.

17. The processing system of claim 16, wherein the magnitude-based attention function is $$w_A = f_A(w_m) = M_A * 0.5 * \ln \frac{1 + w_m / M_A}{1 - w_m / M_A}$$

where $w_m$ is a weight for a convolution kernel, $w_A$ is the weight after applying magnitude-based attention, $M_A = (1+\in_A)*M$, M is the maximum of all $w_m$ in a convolutional layer and $\in_A$ is a hyperparameter with a selected small value.

18. The processing system of claim 10, wherein the instructions further cause the processing system to:
prior to applying the set of location-based attention multipliers or the magnitude-based attention function, standardize the weights in the set of convolution kernels.

19. A non-transitory computer-readable medium having instructions tangibly stored thereon, wherein the instructions, when executed by a processing device of a processing system, causes the processing system to update weights of a set of convolution kernels of a convolutional layer of a convolutional neural network during training of the neural network by:
obtaining the set of convolution kernels of the convolutional layer;
generating a set of convolution kernels having attention-infused weights by performing at least one of:
applying a set of location-based attention multipliers to weights in the set of convolution kernels; or
applying a magnitude-based attention function to the weights in the set of convolution kernels;
performing convolution on an input activation map using the set of convolution kernels with attention-infused weights to generate an output activation map; and
updating the attention-infused weights in the set of convolution kernels using a back propagated gradient of a loss computed for the neural network.

20. The non-transitory computer-readable medium of claim 19, wherein the set of location-based attention multipliers is applied to the weights in the set of convolution kernels, to obtain a set of location-excited weights, and wherein the magnitude-based attention function is applied to the set of location-excited weights.

* * * * *